United States Patent [19]
Wirth, Jr. et al.

[11] Patent Number: 5,598,878
[45] Date of Patent: Feb. 4, 1997

[54] BENCH TOP JOINT JIG

[75] Inventors: John Wirth, Jr.; Jay L. Sanger; Mark K. McCool, all of Casper, Wyo.

[73] Assignee: Woodworker's Supply, Wyo.

[21] Appl. No.: 549,010

[22] Filed: Oct. 27, 1995

[51] Int. Cl.$^6$ .................. B27M 3/00; B27C 1/00; B27C 5/00
[52] U.S. Cl. .................. 144/144.51; 144/144.1; 144/365; 144/367; 144/372; 408/115 R; 409/130
[58] Field of Search .................. 33/197, 529, 561.1, 33/562; 144/3.1, 35.1, 87, 89, 144.1, 144.51, 365, 367, 372; 408/72 R, 115 R; 409/125, 130, 182

[56] References Cited

U.S. PATENT DOCUMENTS

| | | | |
|---|---|---|---|
| 3,695,318 | 10/1972 | Maurey | 144/35.1 |
| 4,428,408 | 1/1984 | Grisley . | |
| 4,445,277 | 5/1984 | Keefe | 144/144.51 |
| 4,809,755 | 3/1989 | Pontikas | 144/144.51 |
| 4,995,435 | 2/1991 | Godfrey | 144/144.1 |
| 5,285,832 | 2/1994 | Gibson | 33/197 |
| 5,492,160 | 2/1996 | McCracken | 144/365 |

OTHER PUBLICATIONS

Woodworker's Supply Catalogue #102, Nov. 1994, pp. 5 and 36.

*Primary Examiner*—W. Donald Bray
*Attorney, Agent, or Firm*—Cushman Darby & Cushman IP Group of Pillsbury Madison & Sutro, LLP

[57] ABSTRACT

A joint jig and template assembly has a base, first and second clamp assemblies attached to the base, each of the first and second clamp assemblies having a clamp member which is capable of moving relative to the base to engage a board placed adjacent the base, a support structure engagable with the base and a template supportable by the support structure. The template has at least one undulating surface to guide a router bit during operation of a router upon the board, and a plurality of bores arranged to guide a bit during operation of a drill upon the board. Movement of the router and drill are limited by the template during operation on the board to cut a particular design in one of the end surfaces of the board to enable the board to mate with another board to form an angled joint.

18 Claims, 4 Drawing Sheets

BENCH TOP JOINT JIG

This invention relates to a bench top joint jig and more particularly to a bench top joint jig for forming a pin and crescent shaped joint between two pieces of wood.

BACKGROUND

Professional woodworkers and hobbyists are often required to accurately form joints between the ends of two boards when making a drawer or box-like structure. It is important for these joints to be strong so that the drawer or box-like structure will withstand every day use. These joints should also be formed such that the finished appearance of the product is attractive.

The so-called pin and crescent joint dates from the 19th century. This joint is very decorative, especially when two different contrasting woods are used, and it has the added advantage of being very strong. Unfortunately, producing a pin and crescent joint by hand is a difficult and time consuming procedure requiring consummate skill in the craftsman. Thus, the pin and crescent joint, despite its appeal and advantages, has been largely abandoned.

SUMMARY OF THE INVENTION

It is an objective of this invention to provide a joint jig which fastens to the top of a work bench, and templates for use therewith, which allows the professional woodworker and hobbyist alike to produce accurate and attractive joints, including the heretofore challenging pin and crescent joint.

To achieve the foregoing and other objects of this invention, the joint jig and template assembly of the invention comprises a base, first and second clamp assemblies attached to the base, each of the first and second clamp assemblies comprising a clamp member which is capable of moving relative to the base to engage a board placed adjacent the base, a support structure engagable with the base, and a template supportable by the support structure. The template has at least one undulating surface to guide a router bit during operation of a router upon the board, and a plurality of bores arranged to guide a bit during operation of a drill upon the board. Movement of the router and drill are limited by the template during operation on the board to cut a particular design in one of the end surfaces of the board to enable the board to mate with another board to form an angled joint.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
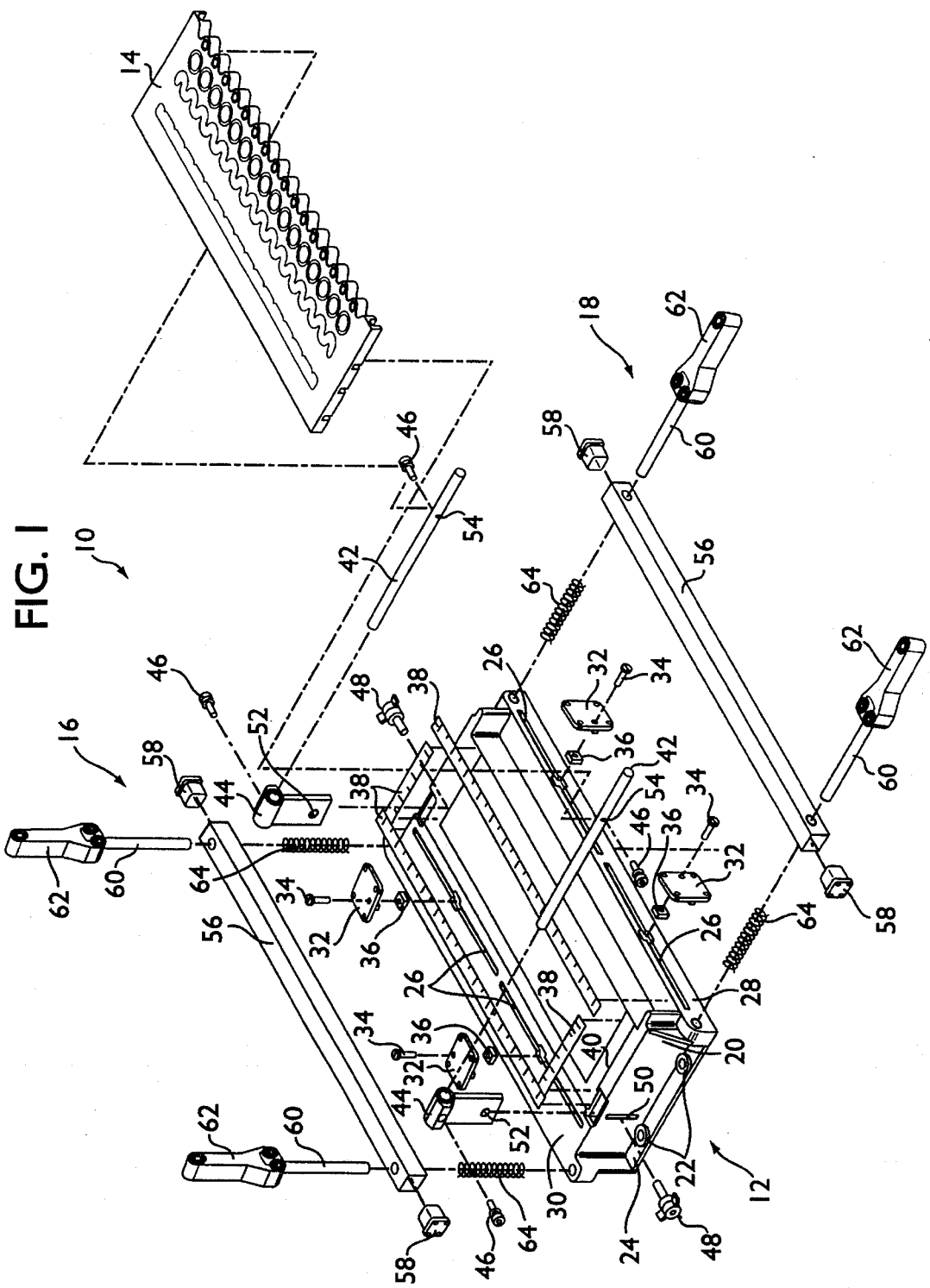
FIG. 1 is an exploded perspective view of the bench top joint jig according to one embodiment of this invention.

According to one preferred embodiment, a bench top joint jig assembly 10 comprises a base assembly 12 and a jig template 14. In use, a board is clamped to the base assembly by clamp assembly 16 or 18 and jig template 14 overlays the board. A router or drill is then used to cut the wood according to the pattern formed on the jig template 14 to form a joint, such as a pin and crescent joint. Each of these assemblies is described below.

Base assembly 12 comprises base 20 which is preferably made of cast aluminum, iron, steel or another suitably strong material. Holes 22 are formed in an edge 24 of base 20 so that the bench top joint jig can be securely bolted or mounted by other means to a work bench. Preferably, the bench top joint jig is bolted directly to the work bench, but the bench top joint jig may alternatively be bolted to a board which can then be clamped to the work bench to allow the bench top joint jig to be readily removable from the bench. A dust removal hole should be formed in the bench below the template to keep the bench top joint jig free of wood chips which can interfere with proper alignment of the wood to be worked upon.

Guide slots 26 are formed on the front surface 28 and on the rear of the top surface 30. Slots 26 are designed to slidably receive guide posts of fence blocks 32. Fence blocks 32 are mounted on base 20 by screws 34 which mate with nuts 36. The fence blocks 32 slide left or right to align a board to be worked upon by loosening screws 34. Other alignment structures could also be used to align the boards, such as pins, etc.

Rulers 38 are preferably placed on the top surface 30 of the base 20 to assist an user in aligning a board to be worked upon. Rulers 38 preferably sit within indent 40 on the top surface 30 so that the entire top surface is flat, thereby minimizing the likelihood that the surface of a received board will be marred.

Support rods 42 are mounted on rod supports 44 and held in place by set screws 46. Rod supports 44 are mounted on base 20 so that they may be adjusted in a vertical direction. Adjustment screws 48 are received in slots 50 and thread into holes 52 in rod supports 44. To adjust the height of support rods 42, the adjustment screws 48 are loosened, the rod supports 44 are vertically adjusted, and the adjustment screws 48 are re-tightened. Thus, the support rods 42 can be accurately adjusted in the vertical direction to ensure that the jig template 14 which rides on the support rods 42 will be accurately aligned in the vertical direction.

A hole 54 is drilled in each support rod 42 and threaded to receive a second set screw 46. Set screw 46 is threaded into hole 54 and when tightened will serve to hold jig template 14 in place on support rods 42.

Alternative structures may be used to support the template 14. Examples of such alternate support structures include forming an aperture in the template 14 to receive support rods 42 or forming the support rods integral with the template 14 and having the integral support rods slidably received in the rod supports 44. Moreover, support rods 42 may be replaced by alternative support structures capable of supporting template 14. One possible example of such structure would be forming support rod 42 to be square in cross-section and mounting template 14 on support rod 42 in a cantilevered fashion. If, alternatively, a single support rod is used which has a square cross-section, U-shaped channels 70 could be replaced with a channel or aperture appropriately shaped to receive the square support rod to thereby prevent the template from rotating on the support rod.

Clamp assemblies 16 and 18 are essentially identical except that clamp assembly 16 is mounted to the top surface 30 of base 20 whereas clamp assembly 18 is mounted to the front surface 28 of base 20. However, these clamp assemblies could be modified as necessary to accomplish their intended functions of clamping a board against the base 20, such as by adding additional support means to support the board along its length, etc.

Each clamp assembly 16, 18 has a clamp bar 56 which is mounted to be movable relative to its respective surface of base 20. Clamp bars 56 are preferably square steel tubing which are capped on the ends by caps 58 to prevent saw dust and wood chips from accumulating within the clamp bars 56. It should be readily apparent, however, that clamp bars may be made of any suitably strong material, depending on the overall dimensions of the bench top joint jig as well as the cross-section of the bars used. For example, it is contemplated that aluminum bars may be used in certain applications. Also, the clamp bars may be coated with a padding material, such as rubber, so as to prevent the surface of the board from being marred by the clamp bar.

Clamp bars 56 are slidably mounted on clamp posts 60. One end of each clamp post 60 is received in an aperture formed in the top surface 30 or front surface 28 of base 20. A toggle 62 is attached to the other end of each of the clamp posts 60. Springs 64 are placed over the clamp posts 60 between the top surface 30 or front surface 28 of base 20 and clamp bars 56, to bias clamp bars 56 away from the respective surfaces of base 20. Alternate structures could be utilized to mount the clamp bars 56 on base 20, such as forming clamp bars 56 and clamp posts 60 integral with each other.

In operation, a board is placed in the jig so that one surface is against either the top or the front of base 20 and clamped in place by the clamp bar 56. Clamp bar 56 is secured against the board by rotating toggles 62. To release the board, toggles 62 are rotated in the opposite direction and springs 64 bias the clamp bar 56 away from the base 20. While clamped, a router is guided by template 14 to cut a pin and crescent shape in the board so that the board can be assembled with a mating board to form a corner of a drawer.

Jig template 14 is designed to ride on support rods 42 above a piece of wood to be worked upon. Two presently preferred embodiments of jig template 14 are illustrated in FIGS. 2–9 however it should be understood that the dimensions of the crescents and bores may be sized in any number of ways according to the dimensions of the wood being worked upon and the preferences of the woodworker. The first embodiment, shown in FIGS. 2–5, illustrates an example of a preferred jig template for making a small pin and crescent joint. The second embodiment, shown in FIGS. 6–9, illustrates an example of a preferred jig template for making a large pin and crescent joint. A detailed description will be given with reference to the first embodiment, but it should be understood that this same description applies equally to the second embodiment with like parts identified by the same reference numerals. This description also applies to templates which may be used to produce pin and crescent joints of other sizes using different sized templates.

Figure 2:
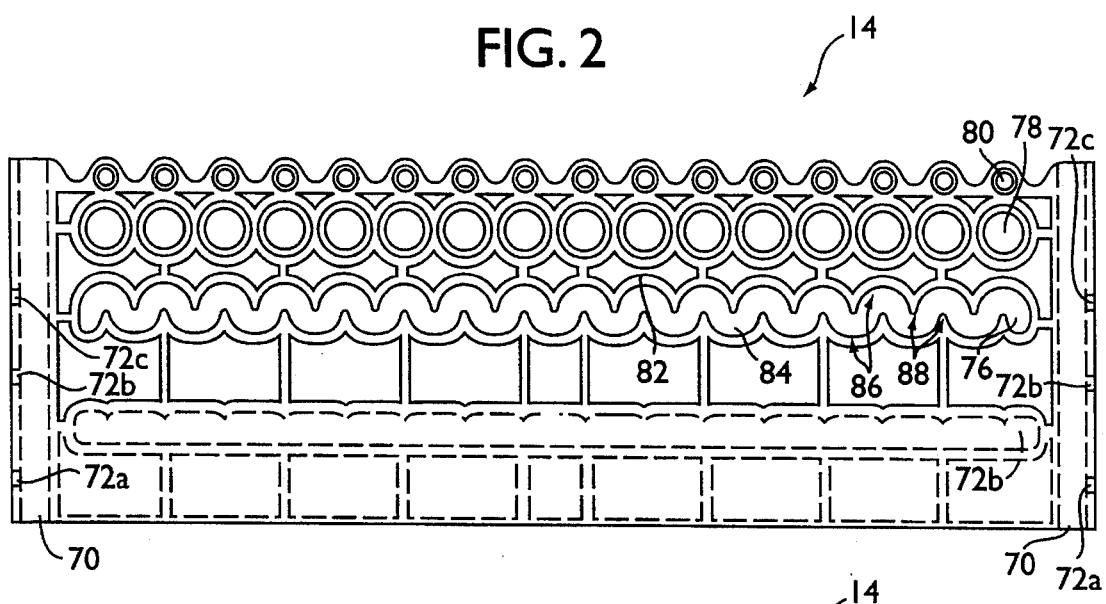
FIG. 2 is a top view of a jig template to be used in the bench top joint jig of FIG. 1.
Figure 3:
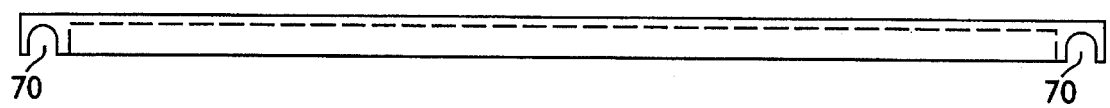
FIG. 3 is a side view of the jig template taken from below of FIG. 2.
Figure 4:
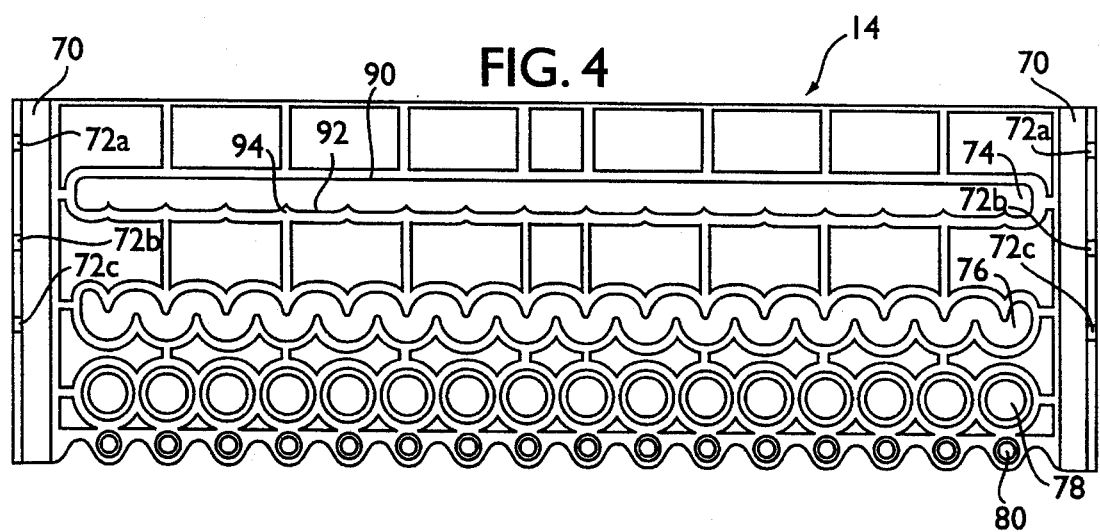
FIG. 4 is a bottom view of the jig template of FIG. 2.

FIG. 2 shows a jig template according to a preferred embodiment of this invention. The bottom of the jig template 14 has U-shaped channels 70 cut in both ends. The U-shaped channels 70 are designed and positioned on the bottom surface of the jig template 14 to receive support rods 42. In this manner the jig template 14 will be supported by the support rods 42 to ride above the top surface 30 of the base 12. Set screws 46 threaded into support rods 42 are used to secure the jig template in place on the support rods 42.

Figure 5:
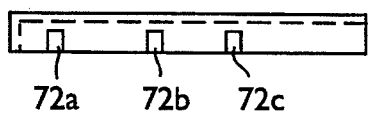
FIG. 5 is a left end view of the jig template of FIG. 2.
Figure 6:
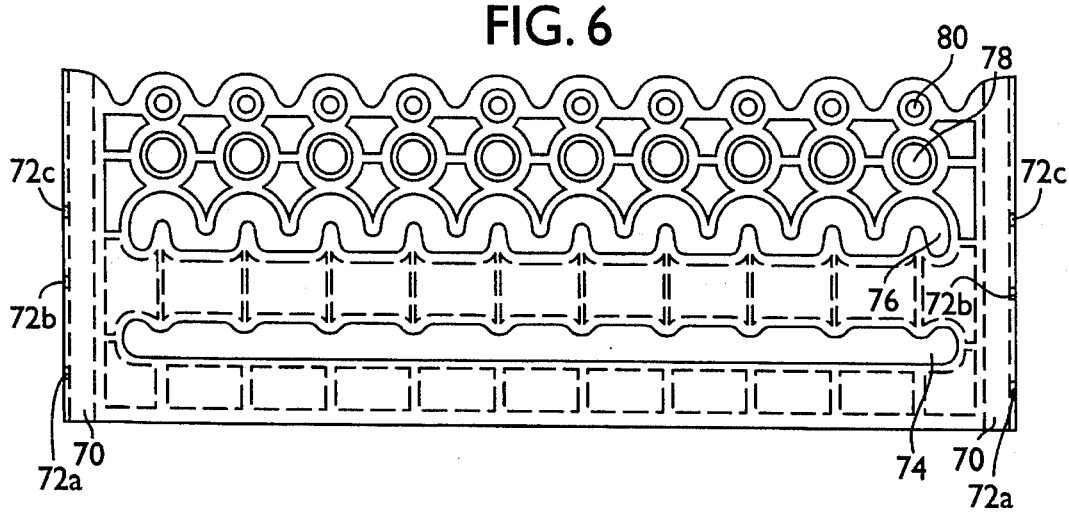
FIG. 6 is a top view of a second jig template to be used in the bench top joint jig of FIG. 1.
Figure 7:
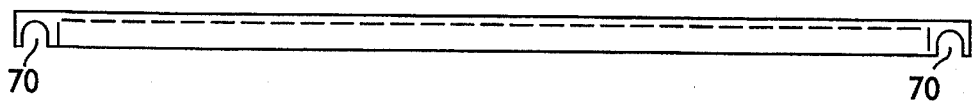
FIG. 7 is a side view of the jig template of FIG. 6.
Figure 8:
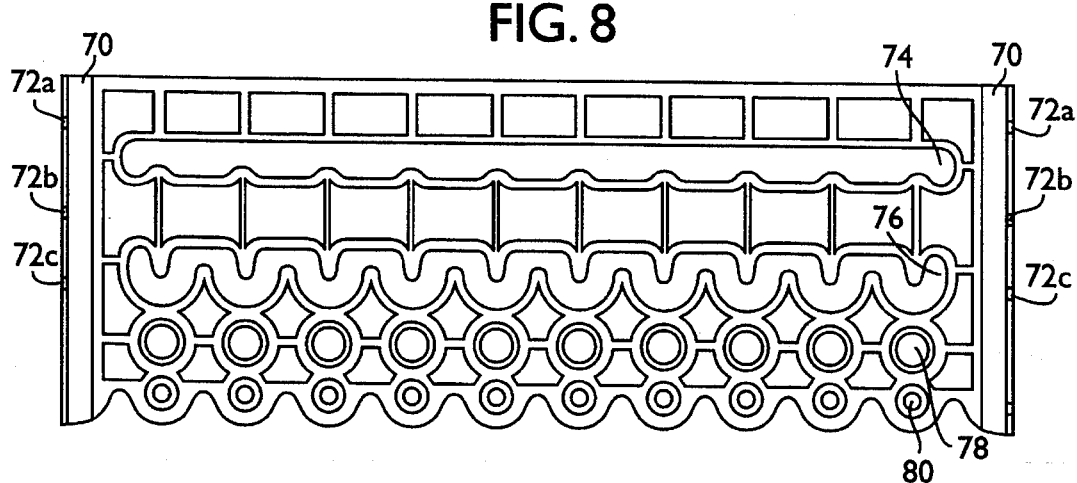
FIG. 8 is a bottom view of the jig template of FIG. 6.
Figure 9:
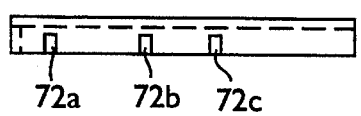
FIG. 9 is an end view of the jig template of FIG. 6.

Three slots 72a–72c are formed on the outer edge of the jig template (see FIG. 5). These slots are specifically located to accurately position the jig template 14 while the router is used to cut away wood from the board clamped by the clamp assemblies 16 and 18.

Jig template 14 has two grooves 74, 76 and two sets of bores 78 and 80. As shown in FIGS. 2, 4, 6 and 8, at least one of the grooves, 74, is formed to have at least one undulating surface 82. This undulating surface 82 is preferably opposed by a second oppositely undulating surface 84 offspaced by from the first undulating surface 82 and having undulations which are out of phase with the undulations of the first undulating surface 82 by approximately one half wavelength. The undulating surfaces 82, 84 are generally formed by repeating an arc with a given radius 86 to form semi-circular shapes. The ends of these semicircles are preferably connected by another series of arcs 88 having a significantly smaller radius of curvature. The radii of the arcs 86 may be the same or different on both undulating surface 82, 84. Likewise, the radii of the arcs 88 may vary depending on which undulating surface 82, 84 it is located.

The second groove, 74, is generally straight with one surface 90 being formed in a substantially planar fashion. The second, opposing surface, 92, is preferably formed to be substantially planar as well, with indents 94 formed in a periodic fashion along its length such that the indents are equally spaced along its length. The use of these grooves and bores will become apparent from the following description of the method of producing a pin and crescent joint.

To use the bench top joint jig apparatus 10 to produce a crescent joint between two pieces of wood, the apparatus 10 must initially be securely mounted to the top of a work bench.

To cut a pin and crescent pocket into the end of a board, the guide rod supports 44 are adjusted to be down as far as they will go in the jig base 20 so that the template support rods 42 rest on the top surface 30 of the base 20. The template 14 is then snapped onto the template support rods 42 and the set screws 46 are positioned in the front slot 72c of the template 14. The set screws 46 are tightened once the template is seated fully onto the guide rods to hold the template in place.

The set screws 46 which hold the support rods securely in the rod supporters 44 are then loosened so that the template 14 on the support rods 42 can be moved forward or backward to position the template 14 relative to the board. Preferably, the rulers 38 are positioned on the top surface 30 in such a manner that when the back edge of the template is located at zero the appropriate groove will be correctly positioned over the edge of a board clamped by clamp assembly 18.

The fence blocks 32 are adjusted so that the crescents of the wavy edge 82 of jig template 14 will be cut in the ends of the boards symmetrically about the center of the width of the board. The zero centered rulers 38 on the base 20 can be used to properly position the board symmetrically. Symmetrical cutting of the pocket is required because the board needs to be rotated end-for-end and not flipped end-for-end to make the cut in the other end of the board. Rotating the board keeps the same face of the board, (the face which will be the inner face of the box or drawer) against the jig base, which is required. Symmetrically positioning the board can be achieved by adjusting the fence blocks so that the center of the width of the board lies in line with the center of the base. If the lay out of the pockets is such that only part of a pin is left at the edges of the board, the center of the width of the board can be shifted right or left ½ the distance from center of pin to center of pin. If care is not taken in obtaining this symmetry the resulting box or drawer will be skewed and will not sit square and flat.

After the fenced blocks 32 have been set, the end board of the box is inserted into the clamp assembly 18 with the inner face against the base, until the end of the board is up against the bottom of the template 14 and secured by clamp assembly 18. A square should be used to assure that the board is perpendicular to the template.

The correct template guide bushing and router bit should be installed in the router taking care to ensure that the collet nut is fully tightened and will not come into contact with the guide bushing. The two brass thumb screws 46 holding the template to the guide rods 42 are then loosened and the template 14 is repositioned until the middle slots 72b on the ends of the template will snap over the brass thumb screws 46. After the template 14 is fully seated on the guide rods 42 the thumb screws 46 are re-tightened.

The thickness of the template 14 and the thickness of the board are measured to determine the correct depth of the router bit. The depth of the router bit is adjusted to this value. The router is then positioned over the front groove 74 which should be positioned over the end of the board at this time. The template guide bushing should fit into the groove so as not to damage the template.

The router is then plunged to the pre-set depth, energized and traversed across the template to cut out wooden material from the board. The router should stay flat against the surface of the template and the template should not tip or the joint will not have a tight fit. If the guide bushing does not fit exactly in the center of the router base, the same part of the router should face the front of the template while making the cut. After the router has completed traversing the front groove 74, the router should be shut off and set aside.

The ends of the template are then loosened by loosing thumb screws 46 and the template 14 is moved so that the thumb screws 46 engage with slots 72a in the side of template 14. The thumb screws are then re-tightened to secure the template 14. The router is set with guide bushing in the rear groove, plunged to the set depth and energized to cut out any remaining material. It is important to keep the router flat and to not allow the template to tip.

Next, the correct size tenon sizing bit is inserted into a hand drill capable of accepting a ⅜" diameter shaft. The stop collar on the tenon bit is adjusted to allow the tenon bit to cut the sum of the thickness of the template and the thickness of the desired side board (the same value noted earlier when setting the depth on the router). The thumb screws 46 holding the template 14 to the guide rods 42 are loosened and the template 14 is moved back so that the front slots 72c are aligned with the thumb screws 46. Using the hand drill and tenon bit, the tenon bit is stroked through the large drill bushings 78 and over the non-sized pins until the preset stop collar is reached.

The clamp bar 56 of clamp assembly 18 is loosened and the face board is rotated end-for-end, keeping the same surface of the board against the base of the jig. The board is reclamped into place and the above described procedure is repeated. The same procedure is repeated for all other similar cuts which must be made to form the back face board and any other face boards.

Figure 10:
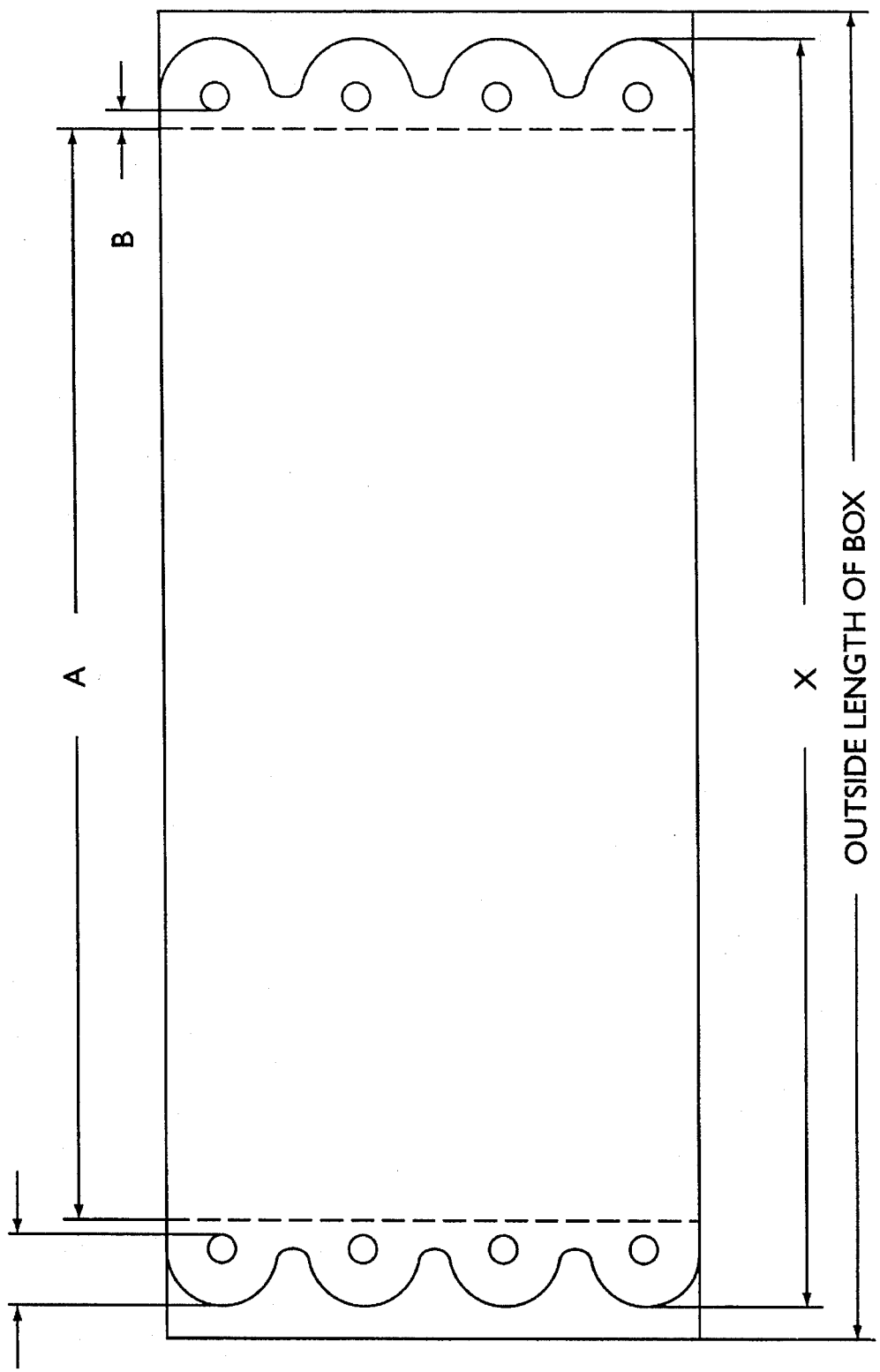
FIG. 10 is a diagram of a board to be used in forming a pin and crescent joint according to this invention.

The next step in completing the joint is to cut the profile of the crescent into the ends of the side boards. First the overall length of the box or drawer must be determined. The sides of the crescent joint are some length between the desired length of the inside of the box and the desired length of the outside of the box. The cut length of the side boards is determined according to the following equation:

$$X=A+2B+2C+\tfrac{1}{8}"$$ (Equation 1)

where X is the length the side boards need to be, A is the desired inside length of the box or drawer, B is the distance of the off-set of the pins (if any) and C is the radius of the crest plus the radius of the pin. See FIG. 10. For the large crescent joint shown in FIGS. 6–9, C=½"+⅛"=⅝" for the small crescent joint shown in FIGS. 2–5, C=³⁄₁₀"+³⁄₃₂"= ⁶³⁄₁₆₀" or 0.394" which is a small fraction over ²⁵⁄₆₄". Then add ⅛" to the calculated value of the length of the board. This ⅛" will be cut away when the crescent profile is cut in the end of the boards. The value of X needs to be at least 8" to allow the board to be clamped to the jig base 20 and still be able to cut the crescent profile in the ends of the board.

After cutting the side boards to the correct length the template is adjusted so that the brass thumb screws 46 are in the front slots 72c on the end of the template and the template is against the rod supports 42. The fence blocks 32 on the top surface 30 are adjusted so that the profile of the crescents will be cut in the ends of the boards symmetrically about the center of the width of the board, (the zero centered scales on the base can be used to position the board symmetrically). Symmetrical cutting of the crescent profile is required because the board needs to be rotated end-for-end and not flipped end-for-end to make the cut in the other end of the board. Rotating the board keeps the same surface of the board against the jig base 20, which is required. Symmetrically positioning the board can be achieved by adjusting the fence blocks so the center of the width of the board lies in line with the center of the base. If the lay out of the pockets is such that only part of a pin is left at the edges of the board, the center of the width of the board can be shifted right or left ½ the distance from center of pin to center of pin. If care is not taken in obtaining this symmetry the resulting box or drawer will be skewed and will not sit square and flat.

After the fence blocks 32 have been adjusted and locked in place, the side board is inserted under the top bar clamp 16 and under the template 14. To allow the board to slide under the template, the adjustment screws 48 that lock the rod supports 44 in place are loosened and the rod supports 44, rods 42 and template 14 are lifted as one unit, until the board fits between the top of the jig base 20 and the bottom of the template 14. The template is then allowed to rest on top of the board and the board is slid forward until it extends past the peaks of the crescents by ³⁄₃₂" if using the large crescent joint template or ⅛" if using the small crescent joint template. The amount that the board extends past the front of the template includes ¹⁄₁₆" of the ⅛" which was added to the length of the board when it was cut to length. The other ¹⁄₁₆" will be removed when the other end is shaped. A square should be used to assure that the board is perpendicular to the edge of the template. The board is then clamped in place using clamp assembly 16.

The router is used to cut the crescent profile in the end of the board using the template guide bushing on the router as a guide to follow the contour of the edge of the template 14. After the profile is cut into the end of the board, a standard drill and drill bit are used to drill the bores which will receive the pins. A ¼" bit is used with the large crescent joint template and a ³⁄₁₆" bit is used with the small crescent joint template. The bores are formed by positioning the drill bit in the small set of bores 80 in template 14 and energizing the drill. Preferably, metal bushings are inset into the template surrounding the bores 80 to prevent the drill bit from cutting material out of the template 14. The board is then rotated end-for-end and the process is repeated. The process is also repeated for all other side boards that need to be cut to match with the face boards that were previously made.

The box is assembled by matching the boards having the pin and crescent cut-outs formed by the first procedures with the crescent profile boards formed with the second procedure. It may be necessary to tap the side boards onto the face boards with a mallet and a block of wood so as not to mark the surface of the box.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims. For example, the shape and arrangement of the grooves and bores can be varied to enable production of interfitting joints of various configurations.

Thus, it is to be understood that variations in the particular structure disclosed can be made without departing from the novel aspects of this invention as defined in the claims.

What is claimed is:

1. A joint jig and template assembly, comprising:
    a base;
    first and second clamp assemblies attached to said base, each of said first and second clamp assemblies comprising a clamp member which is capable of moving relative to said base to engage a board placed adjacent said base;
    a support structure engagable with said base; and
    a template supportable by said support structure, said template having at least one undulating surface to guide a router bit during operation of a router upon the board, and a plurality of bores arranged to guide a bit during operation of a drill upon the board;
    whereby movement of the router and drill are limited by the template during operation on the board to cut a particular design in one of the end surfaces of the board to enable the board to mate with another board to form an angled joint.

2. A bench top joint jig for producing a pin and crescent joint, comprising:
    a base;
    a template having at least one undulating groove extending from a top surface of said template through to a bottom surface of said template, and a plurality of bores formed in said template, and
    a support structure for supporting said template on said base so that said template is positioned closely adjacent a piece of wood contacting said base;
    wherein said bores are formed to receive a drill bit of a drill to thereby position said drill bit with respect to the piece of wood contacting said base; and
    wherein said undulating groove extending through said template is formed to receive a router bit of a router to thereby position said router bit with respect to the piece of wood contacting said base.

3. The joint jig of claim 2, further comprising:
    bushings disposed in said bores.

4. A template for use with a joint jig, comprising:
    an elongate main body having a top surface, a front edge, a rear edge and two side edges; and
    a first undulating surface formed on said structure, said first undulating surface defining crests and valleys along a length of the first undulating surface;
    a first set of bores formed in said structure, said first set of bores positionally corresponding to at least one of said crests and said valleys defined by said first undulating surface;
    a first groove formed in said structure, said first groove having a first groove surface and a second groove surface in faced opposing relation, both of said first groove surface and said second groove surface defining crests and valleys such that crests defined by the first groove surface face valleys defined by the second groove surface; and
    mounts formed in said template enabling said template to be secured to the joint jig such that at least one of the first undulating surface, the first set of bores and the first groove may be maintained in a position such that the template may be used to guide a cutting bit of a cutting apparatus while cutting a pattern in a piece of wood.

5. The template according to claim 4, wherein a second set of bores are formed in said elongate main body, one of said bores of said second set of bores corresponding to each said bore of said first set of bores.

6. The template according to claim 5, wherein a diameter of each bore of the first set of bores is approximately equal to a first value and a diameter of each bore of the second set of bores is approximately equal to a second value, said second value being larger than said first value.

7. The template according to claim 4, further comprising a second groove formed in said structure, said second groove having a first substantially flat surface and a second surface facing said first surface and defining projections along a length thereof at locations which correspond to at least one of the crests and the valleys defined by said first undulating surface.

8. The template according to claim 4, wherein the first undulating surface defines the front edge of the elongate main body.

9. The template according to claim 4, further comprising a first set of bushings, one of said bushings being disposed in each bore of said first set of bores.

10. The template according to claim 4, wherein said mount comprises at least one U-shaped channel having side walls and being formed along at least one of the side edges of said elongate main body, said U-shaped channel being formed to receive a mounting rod of the joint jig.

11. The template according to claim 10, wherein at least one slot is defined in at least one of said side walls of said U-shaped channel at a location relative to at least one of said first undulating surface, said first set of bores and said first groove such that said at least one of said first undulating surface, said first set of bores and said first groove may be maintained in a predetermined spatial relationship to an edge of the piece of wood held by the joint jig.

12. The template according to claim 4, wherein said crests defined by said first undulating surface have a first radius of curvature, said valleys defined by said second undulating surface have a second radius of curvature larger than the first radius of curvature.

13. The template according to claim 4, wherein the bores of the first set of bores are located in said template at regions corresponding to said crests of said first undulating surface.

14. The template according to claim 4, wherein the crests and valleys defined by said first undulating surface are smoothly rounded.

15. The template according to claim 4, wherein the crests and valleys defined by the first and second groove surfaces are smoothly rounded.

16. The joint jig and template assembly according to claim 1, wherein said support structure comprises at least one rod mounted on said base and extending across a surface of said base thereby enabling the template to be supported by said support structure by engaging said rod.

17. The joint jig and template assembly according to claim 16, wherein the template has an area defining at least one engagement surface to receive said rod.

18. The joint jig and template assembly according to claim 17, wherein the engaging surface is generally U-shaped and has at side walls, and wherein at least one slot is defined in at least one of said side walls of said U-shaped engaging surface to positionally mount the template on said rod and prevent said template from sliding relative to said rod.

* * * * *